(12) United States Patent
Lee

(10) Patent No.: US 8,248,550 B2
(45) Date of Patent: Aug. 21, 2012

(54) LIQUID CRYSTAL DISPLAY DEVICE

(75) Inventor: Min-cheol Lee, Seoul (KR)

(73) Assignee: Samsung Electronics Co., Ltd. (KR)

(*) Notice: Subject to any disclaimer, the term of this patent is extended or adjusted under 35 U.S.C. 154(b) by 323 days.

(21) Appl. No.: 12/603,529

(22) Filed: Oct. 21, 2009

(65) Prior Publication Data

US 2010/0039575 A1     Feb. 18, 2010

Related U.S. Application Data

(63) Continuation of application No. 11/781,112, filed on Jul. 20, 2007, now Pat. No. 7,626,649.

(30) Foreign Application Priority Data

Sep. 8, 2006  (KR) .................. 10-2006-0086747

(51) Int. Cl.
*G02F 1/136* (2006.01)
*G02F 1/1343* (2006.01)
*G02F 1/1345* (2006.01)

(52) U.S. Cl. .............. 349/42; 349/43; 349/46; 349/143; 349/149

(58) Field of Classification Search .............. 349/39, 349/42, 43, 46, 143, 149
See application file for complete search history.

(56) References Cited

U.S. PATENT DOCUMENTS

| 5,532,180 | A  | * | 7/1996 | den Boer et al. ............... 438/30 |
| 6,909,415 | B2 | * | 6/2005 | Kumagawa et al. ............ 345/92 |
| 6,982,775 | B2 | * | 1/2006 | Lee et al. ...................... 349/139 |
| 7,133,004 | B2 | * | 11/2006 | Tomitani ....................... 345/58 |
| 7,423,620 | B2 | * | 9/2008 | Jen et al. ....................... 345/90 |
| 7,561,150 | B2 | * | 7/2009 | Kikuchi ........................ 345/204 |
| 7,924,255 | B2 | * | 4/2011 | Hsu et al. ...................... 345/94 |

FOREIGN PATENT DOCUMENTS

| CN | 1366653 | 8/2002 |
| CN | 1758317 | 4/2006 |

* cited by examiner

*Primary Examiner* — Uyen Chau N Le
*Assistant Examiner* — Michael Mooney
(74) *Attorney, Agent, or Firm* — Innovation Counsel LLP

(57) ABSTRACT

A liquid crystal display device includes a first substrate which comprises a plurality of pixels where a thin film transistor and a pixel electrode electrically connected to the thin film transistor are formed, the first substrate including a gate line and a data line which insulatingly intersect each other; and a gate driver which applies a gate driving signal to the gate line, the thin film transistor including a gate electrode which is connected to the gate line; a source electrode which is connected to the data line; and a drain electrode which is connected to the pixel electrode, and the pixels being decreased in a value of Cp/(Cp+Clc+Cst) as going toward the gate driver (where, Cp: a sum of parasitic capacity between the gate electrode and the source electrode and parasitic capacity between the gate electrode and the drain electrode, Clc: liquid crystal capacity, and Cst: storage capacity).

20 Claims, 18 Drawing Sheets

US 8,248,550 B2

LIQUID CRYSTAL DISPLAY DEVICE

CROSS-REFERENCE TO RELATED APPLICATIONS

This application is a continuation of U.S. patent application Ser. No. 11/781,112, filed Jul. 20, 2007, which claims priority upon Korean Patent Application No. 2006-0086747, filed on Sep. 8, 2006 in the Korean Intellectual Property Office, the disclosure of which is incorporated herein by reference.

BACKGROUND OF INVENTION

1. Field of Invention

Apparatuses and methods consistent with the present invention relate to a liquid crystal display device.

2. Description of the Related Art

A liquid crystal display (LCD) device includes a first substrate where thin film transistors are formed, a second substrate which is disposed opposite to the first substrate, and a liquid crystal layer disposed between the two substrates.

Gate lines and data lines are formed on the first substrate and insulatingly intersect intersect each other to form pixels. The pixels are connected to the thin film transistors. When the gate lines receive a gate signal, i.e., a gate-on voltage Von, to turn on the thin film transistors, a data voltage Vd applied through the data lines is charged in the pixels. Orientation of liquid crystal molecules in the liquid crystal layer is determined by an electric filed between the pixel voltage Vp charged in the pixels and a common voltage on the common electrode. The data voltage Vd is applied with different polarities per frames.

The data voltage Vd applied to the pixels is reduced by parasitic capacity Cp between the gate electrode and the source electrode (drain electrode) to form the pixel voltage Vp. The voltage difference between the data voltage Vd and the pixel voltage Vp is the kickback voltage Vkb.

The gate lines receive a gate signal through a gate driver. Due to resistance in the gate lines, the pixel adjacent to the gate driver receives a gate signal which is less delayed, and the pixel far from the gate driver receives a gate signal which is significantly delayed.

The level of the kickback voltage varies depending on the delay of the gate signals, thereby making the brightness of the screen non-uniform.

SUMMARY OF THE INVENTION

Accordingly, it is an aspect of the present invention to provide an LCD device having more uniform brightness through reduction in the delay difference of the gate signals.

In accordance with an aspect of the invention, a liquid crystal display having a plurality of pixels and driving transistors each having gate, source and drain electrodes, characterized in that the pixels of the display are constructed so that the ratio of the parasitic capacities between the gate and each of the source and drain electrodes to the sum of parasitic capacities between the gate and each of the source and drain electrodes plus the liquid crystal capacity plus the storage capacity decreases towards the gate driver.

Expressed mathematically, the ratio $Cp/(Cp+Clc+Cst)$ decreases towards the gate driver, where $Cp$ is the sum of parasitic capacities between the gate and each of the source and drain electrodes; $Clc$ is the liquid crystal capacity; and $Cst$ is the storage capacity.

According to an aspect of the invention, the thin film transistor comprises a pair of channel regions which are separated with the drain electrode disposed therebetween, and the area where the gate electrode and the drain electrode overlap becomes smaller towards the gate driver.

According to an aspect of the invention, the thin film transistor comprises a channel region having a U-shape, the area where the gate electrode and the drain electrode overlap becoming smaller towards the gate driver.

According to an aspect of the invention, the storage capacity of the pixel is uniform.

According to an aspect of the invention, the storage capacity of the pixel becomes larger towards the gate driver.

According to an aspect of the invention, the area where the gate electrode and the source electrode overlap and the area where the gate electrode and the drain electrode overlap are uniform.

According to an aspect of the invention, the pixels are divided into a plurality of blocks which have the same value of $Cp/(Cp+Clc+Cst)$.

According to an aspect of the invention, the liquid crystal display device further comprises a second substrate which faces the first substrate and where a common electrode is formed; and a liquid crystal layer which is disposed between the first substrate and the second substrate and in a vertically aligned (VA) mode.

According to an aspect of the invention, a pixel electrode cutting pattern is formed on the pixel electrode, and a common electrode cutting pattern is formed on the common electrode.

According to an aspect of the invention, the gate driver comprises a shift register.

According to an aspect of the invention, the pixel is formed in a display region and the shift register comprises a first shift register and a second shift register which are disposed opposite to each other with respect to the display region.

According to an aspect of the invention, the gate line is alternately connected to the first shift register and the second shift register.

According to an aspect of the invention, the pixel electrode extends lengthwise in the direction in which the gate line is extended.

According to an aspect of the invention, three neighboring pixel electrodes in the direction in which the data line extends (hereinafter, the extending direction of the data line) are connected to different gate lines.

According to an aspect of the invention, two of the three neighboring pixel electrodes in the extending direction of the data line are connected to the same data line.

According to an aspect of the invention, the three neighboring pixel electrodes in the extending direction of the data line are driven sequentially.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION

In the following description, if a layer is said to be formed 'on' another layer, then a third layer may be disposed between the two layers or the two layers may be contacted with each other. In other words, it will be understood that when an element such as a layer, film, region, or substrate is referred to as being "on" another element, it can be directly on the other element or intervening elements may also be present. Further, a layer is said to be formed 'right on' another layer, it will be understood that the two layers contact with each other.

It should be noted that a pixel unit refers to a unit to display a screen where different colors of light from a plurality of pixels are mixed to provide light with desired color and brightness. For example, a red pixel, a blue pixel, and a green pixel form into one pixel unit.

Hereinafter, an LCD device according to exemplary embodiments of the present invention will be described with reference to FIGS. 1 through 5

Figure 4:
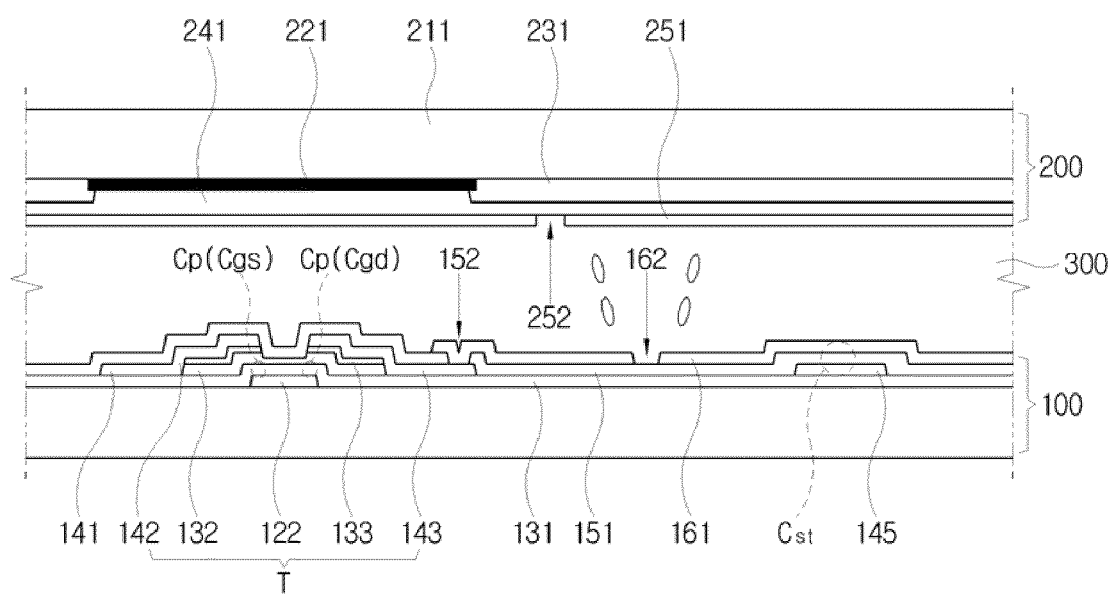
FIG. 4 is a sectional view taken along line IV-IV in FIG. 3.

Referring to FIG. 4, an LCD device 1 includes a first substrate 100 where thin film transistors are formed, a second substrate 200 which faces the first substrate 100 and where color filters 231 are formed, and a liquid crystal layer 300 disposed between the substrates 100 and 200.

To start with the first substrate 100, a gate wire 121 and 122 is formed on a first insulating substrate 111. The gate wire 121 and 122 may be a metal single layer or metal multi layers. The gate wire 121 and 122 includes a gate line 121 which extends horizontally in a display region and a gate electrode 122 connected to the gate line 121.

A shift register 123 is formed in a non-display region and connected to the gate line 121. The shift register 123, as a gate driver, drives the gate line 121, e.g., applies a gate-on voltage and a gate-off voltage to the gate line 121.

Figure 1:
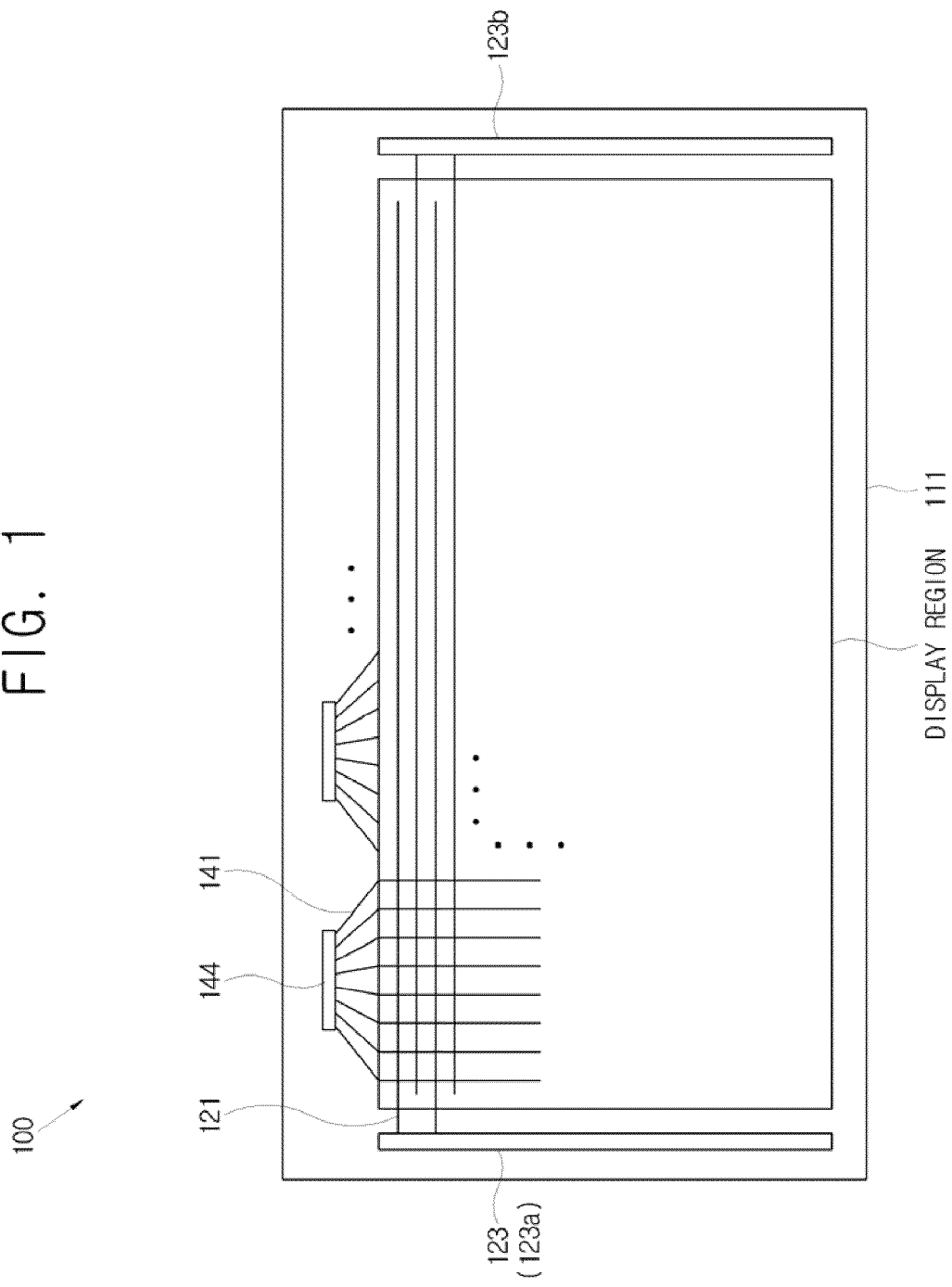
FIG. 1 is a arrangement view of a first substrate in an LCD device according to a first exemplary embodiment of the present invention.
Figure 2:
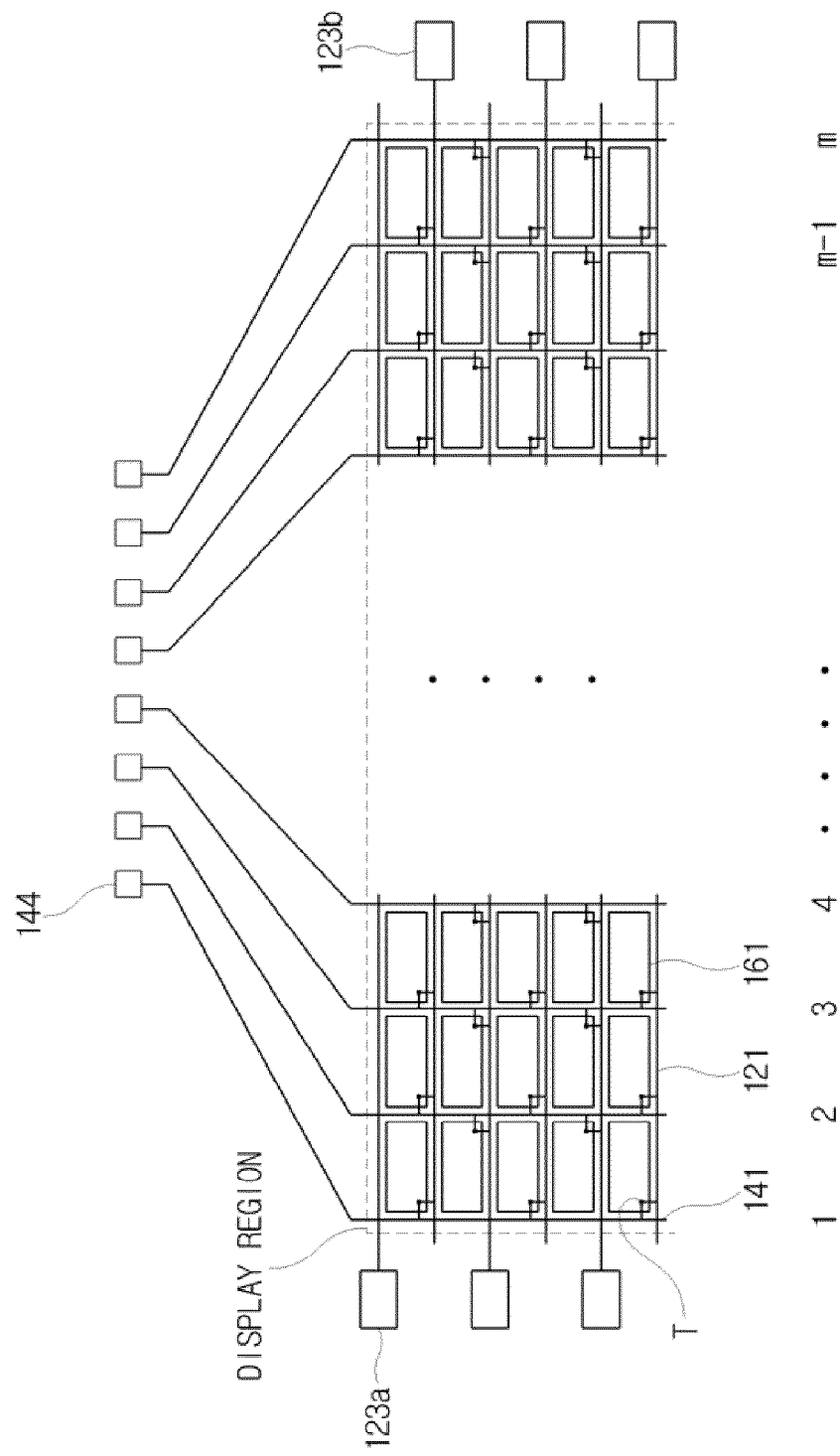
FIG. 2 is an enlarged arrangement view of the first substrate in the LCD device according to the first exemplary embodiment of the present invention.
Figure 3:
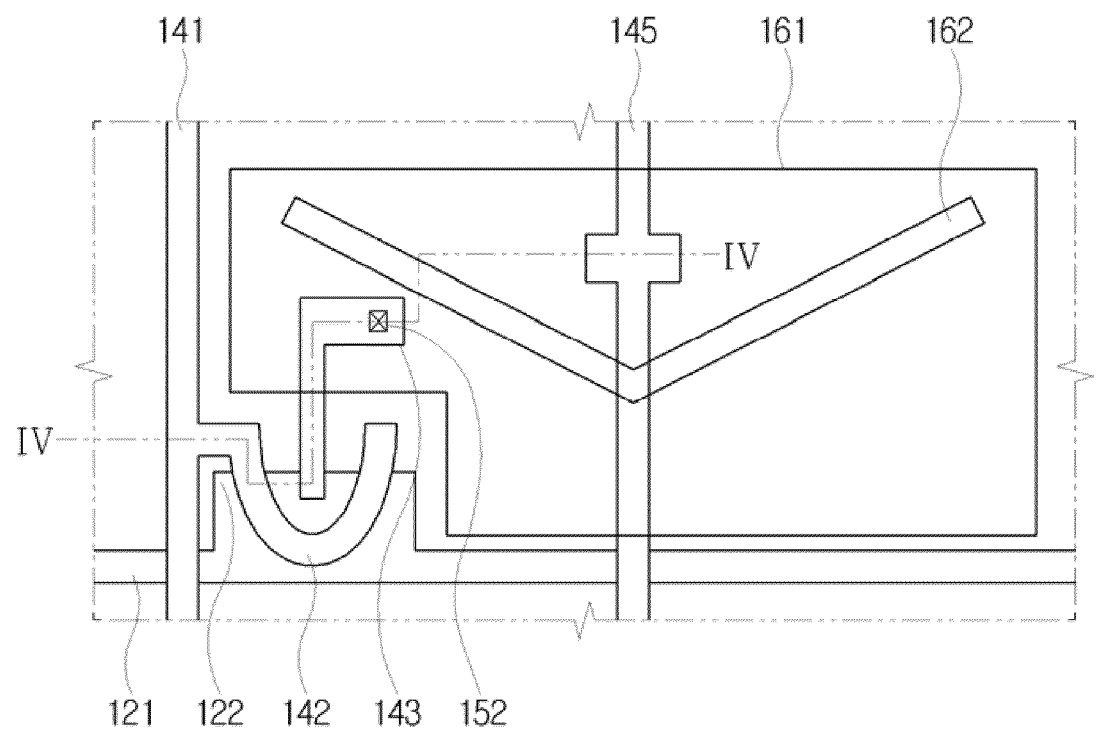
FIG. 3 is an arrangement view of one pixel in the LCD device according to the first exemplary embodiment of the present invention.

The shift register 123 includes a first shift register 123a disposed on a left side of a display region and a second shift register 123b disposed on a right side of the display region. Referring to FIG. 2, the first shift registers 123a are connected to odd numbered gate lines 121, and the second shift registers 123b are connected to even numbered gate lines 121. Even though it is not shown, the first shift registers 123a are electrically connected to one another, and the second shift registers 123b are electrically connected to one another.

The shift register 123 is formed while forming the first substrate 100 and may include a plurality of thin film transistors.

A gate insulating layer 131 is made of silicon nitride (SiNx) or the like and formed on the first insulating substrate 111 to cover the gate wire 121 and 122.

A semiconductor layer 132 is made of amorphous silicon or the like and formed on the gate insulating layer 131 over the gate electrode 122. An ohmic contact layer 133 is made of silicide or n+ hydrogenated amorphous silicon which is highly doped with n-type impurities, and formed on the semiconductor layer 132. The ohmic contact layer 133 is removed in a channel region between a source electrode 142 and a drain electrode 143.

A data wire 141, 142, 143, 144 and 145 is formed on the ohmic contact layer 133 and the gate insulating layer 131. The data wire 141, 142, 143, 144 and 145 may be a metal single layer or metal multi layers. The data wire 141, 142, 143, 144 and 145 includes a data line 141 which extends vertically to intersect the gate line 121 to form a pixel, the source electrode 142 which is branched from the data line 141 and extends over the ohmic contact layer 133, the drain electrode 143 separated from the source electrode 142 and formed on a part of the ohmic contact layer 133 opposite to the source electrode 142, a data pad 144 which extends from the data line 141 to be disposed in the non-display region, and a storage electrode line 145 formed parallel with the data line 141. The storage electrode line 145 forms storage capacity Cst along with a pixel electrode 161. The storage electrode line 145 may receive a common voltage.

The data pad 144 is connected to a data driver (not shown) to receive a data signal. The data pad 144 is formed to be wider as compared with the data line 141.

A passivation layer 151 is formed on the data wire 141, 142, 143, 144 and 145 and a portion of the semiconductor layer 132 which is not covered with the data wire 141, 142, 143, 144 and 145. A contact hole 152 is formed in the passivation layer 151 to expose the drain electrode 143.

The pixel electrode 161 is formed on the passivation layer 151. The pixel electrode 161 is made of a transparent conductive material such as indium tin oxide (ITO) or indium zinc oxide (IZO). The pixel electrode 161 is connected to the drain electrode 143 through the contact hole 152. A pixel electrode cutting pattern 162 is formed on the pixel electrode 161.

The pixel electrode cutting pattern 162 is formed to divide the liquid crystal layer 300 into a plurality of domains along with a common electrode cutting pattern 252 (described later).

The pixel electrode 161 has a rectangular shape which extends along an extending direction of the gate line 121.

Three neighboring pixel electrodes 161 in an extending direction of the data line 141, i.e., three pixels, form into a pixel unit as a unit of a screen. The three pixel electrodes 161 are connected to different gate lines 121, respectively. The pixel electrodes 161 are connected alternately to the data line 141 on the left and to data line 141 on the right along the extending direction of the data line 141.

In a conventional layout, three pixel electrodes in one pixel unit are disposed in the extending direction of the gate line and connected to different gate lines respectively. In a layout according to the present embodiment, however, the number of gate lines 121 increases by three times, while the number of data lines 141 decreases by one-third as compared with the conventional layout to drive the same number of pixels.

Generally, a circuit to drive the data line 141 is more complicated and expensive than a circuit to drive the gate line 121. In the present exemplary embodiment, the circuit for the data line 141 is reduced as the number of data lines 141 decreases by one-third, thereby reducing the manufacturing cost. On the other hand, as the number of gate lines 121 increases by three times, the cost of manufacturing the circuit for the gate line 121 may increase. In the present embodiment, however, the gate line 121 is driven by the shift register 123 formed on the first substrate 100, and thus the cost of manufacturing the circuit does not increase.

Meanwhile, the pixel electrode 161 extends lengthwise in the extending direction of the gate line 121, and thus an interval between the gate lines 121 decreases. Thus, the shift register 123 has a spatial limitation when being formed. In the present embodiment, however, as the shift register 123 is provided opposite sides of the display region, it is not difficult to provide a space for the shift register 123.

Next, the second substrate 200 will be described in the following. A black matrix 221 is formed on a second insulating substrate 211. The black matrix 221 is disposed between a red, green and blue filters to divide the filters, and prevents light from being irradiated directly to a thin film transistor T disposed on the first substrate 100. The black matrix 221 is typically made of a photoresist organic material including a black pigment. The black pigment may be carbon black, titanium oxide or the like.

The color filter layer 231 includes the red, green and blue filters which are alternately disposed and separated by the black matrix 221. The color filter layer 231 endows colors to light irradiated from the backlight unit (not shown) and passing through the liquid crystal layer 300. The color filter layer 231 is generally made of a photoresist organic material.

An overcoat layer 241 is formed on the color filter layer 231 and the black matrix 231 exposed between the color filter layers 221. The overcoat layer 241 provides a flat surface to the color filter 231 and protects the color filter 231. The overcoat layer 241 may include photoresist acrylic resin.

A common electrode 251 is formed on the overcoat layer 241. The common electrode 251 is made of a transparent conductive material such as indium tin oxide (ITO), indium zinc oxide (IZO), or the like. The common electrode 251 together with the pixel electrode 161 of the thin film transistor substrate 100 applies a voltage to the liquid crystal layer 300 thin film transistor.

The common electrode cutting pattern 252 is formed on the common electrode 251. The common electrode cutting pattern 252 divides the liquid crystal layer 300 into a plurality of domains along with the pixel electrode cutting pattern 162 of the pixel electrode 161.

The pixel electrode cutting pattern 162 and the common electrode cutting pattern 252 may have various shapes. In other exemplary embodiments, protrusions may be provided to divide the liquid crystal layer 300 into a plurality of domains instead of the cutting patterns 162 and 252.

The liquid crystal layer 300 is disposed between the first substrate 100 and the second substrate 200. The liquid crystal layer 300 is in a vertically aligned (VA) mode, where liquid crystal molecules are aligned perpendicular to the substrates 100 and 200 in a lengthwise direction between the substrates 100 and 200 under a voltage-off state. The liquid crystal molecules with negative dielectric anisotropy are oriented perpendicularly to an electric field in a voltage-on state.

However, if the pixel electrode cutting pattern 162 and the common electrode cutting pattern 252 are not formed, the orientation of the liquid crystal molecules is not determined. Accordingly, the liquid crystal molecules are disorganized, and thus a disclination line is formed in an interface between the liquid crystal molecules different in the orientation. The pixel electrode cutting pattern 162 and the common electrode cutting pattern 252 generate a fringe field when a voltage is applied to the liquid crystal layer 300, thereby determining the orientation of the liquid crystal molecules. Also, the liquid crystal layer 300 is divided into a plurality of domains depending on the arrangement of the pixel electrode cutting pattern 162 and the common electrode cutting pattern 252.

Figure 5:
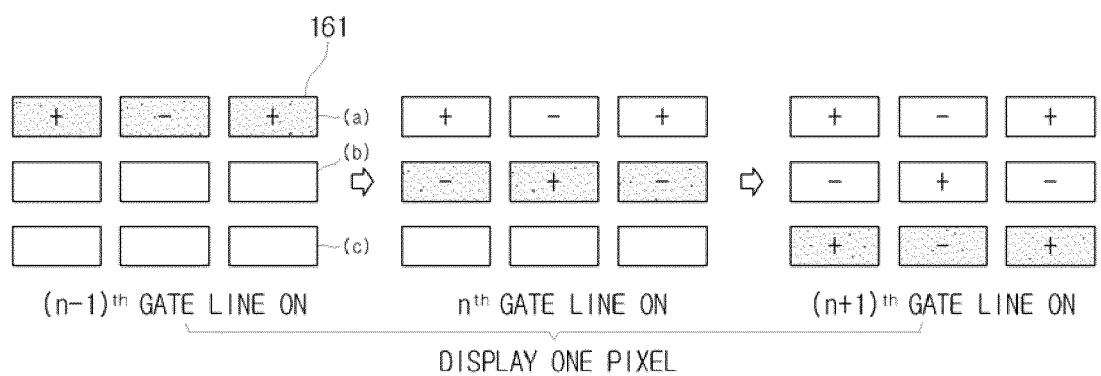
FIG. 5 illustrates driving the LCD device according to the first exemplary embodiment of the present invention.

Referring to FIG. 5, driving the LCD device 1 will be described.

When the gate-on voltage is provided to the (n−1)th gate line 121, the thin film transistor 150 connected to the (n−1)th gate line 121 is turned on. Accordingly, the pixel electrodes 161 disposed in a row (a) and connected to the (n−1)th gate line 121 are turned on.

Then, the gate-on voltage is provided to the (n)th gate line 121, so that the pixel electrodes 161 disposed in a row (b) and connected to the (n)th gate line 121 are turned on.

Likewise, when the gate-on voltage is provided to the (n+1)th gate line 121, the pixel electrodes 161 disposed in a row (c) and connected to the (n+1)th gate line 121 are turned on. Accordingly, display of one pixel unit is completed. For the display of one pixel unit, three gate lines 121 are sequentially driven, and accordingly the data line 141 provides a data voltage for each pixel electrode 161.

Here, a polarity of voltages applied to the pixel electrodes 161 is adjusted in a dot inversion type.

As described above, three pixel electrodes 161 in one pixel unit are driven not at the same time but sequentially. Further, the gate-on voltage is provided three times for driving one pixel unit.

Figure 6:
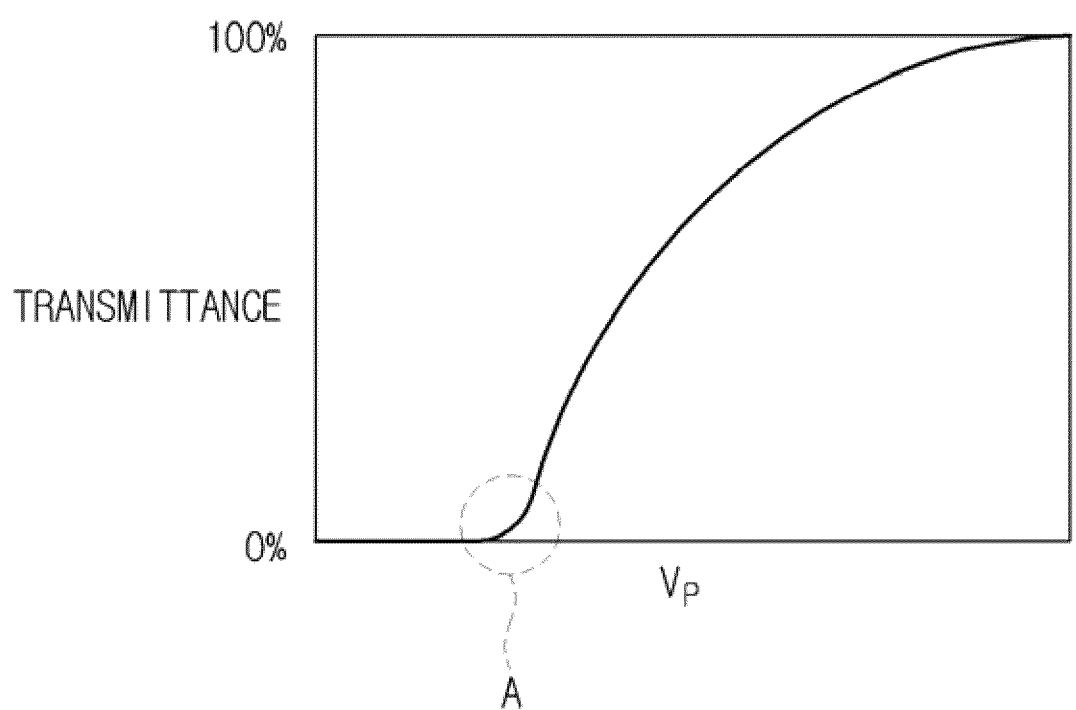
FIG. 6 illustrates transmittance according to a pixel voltage in the LCD device according to the first exemplary embodiment of the present invention.

The LCD device 1 according to the first exemplary embodiment is in a normally black mode and has transmittance varied according to a pixel voltage shown in FIG. 6. Transmittance variation in a low gray scale voltage in area A of FIG. 6 is about three times as drastic as that in an LCD device with twisted nematic (TN) liquid crystal molecules.

In the foregoing LCD device 1, the gate line 121 receives the gate signal through the shift register 123 connected thereto. Because of resistance of the gate line 121, a thin film transistor adjacent to the shift register 123 receives a gate signal which is less delayed, and a pixel electrode far from the shift register 123 receives a gate signal which is delayed a lot.

Figure 7:
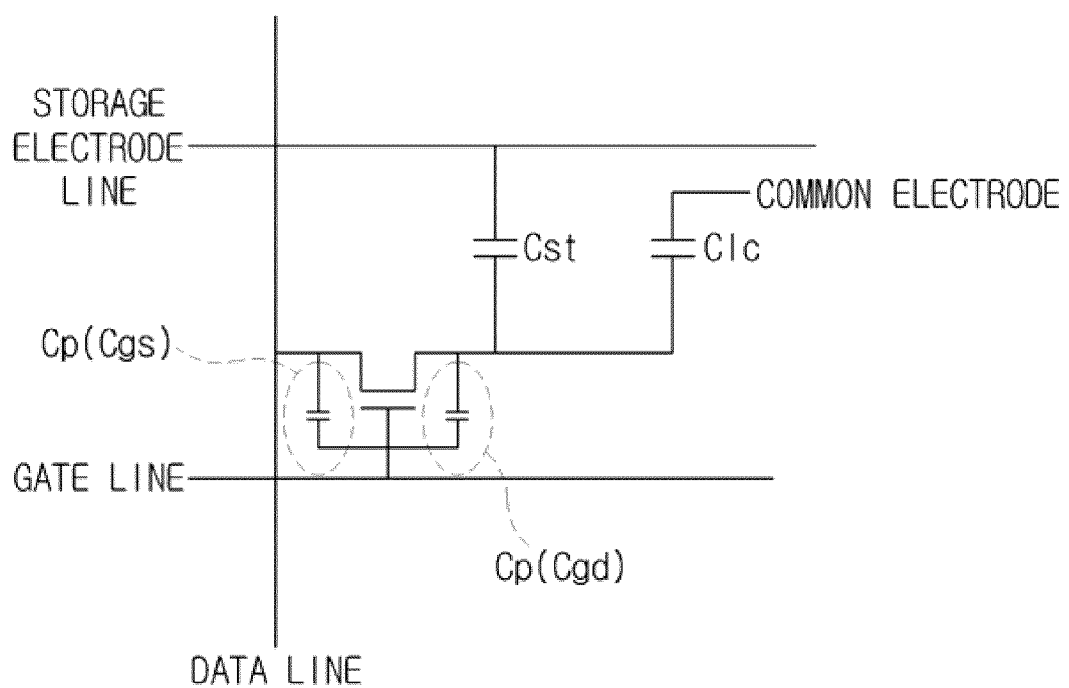
FIG. 7 is an equivalent circuit diagram of one pixel in the LCD device according to the first exemplary embodiment of the present invention.

Hereinafter, brightness difference according to delay of the gate signal will be described with reference to FIGS. 7 through 8C.

A kickback voltage is expressed as equation 1.

$$Vkb=(Von-Voff)*Cp/(Clc+Cst+Cp) \qquad \text{<Equation 1>}$$

It is noted that Cp indicates a sum of parasitic capacity Cgs between the gate electrode and the source electrode and parasitic capacity Cgd between the gate electrode and the drain electrode; Clc denotes liquid crystal capacity; Cst denotes storage capacity; Von, gate-on voltage; and Voff denotes gate-off voltage.

If the gate signal is substantially delayed, the gate-on voltage is not applied smoothly, thus the kickback voltage becomes low. The kickback voltage becomes higher for a negative pixel voltage than for a positive pixel voltage.

Figure 8A:
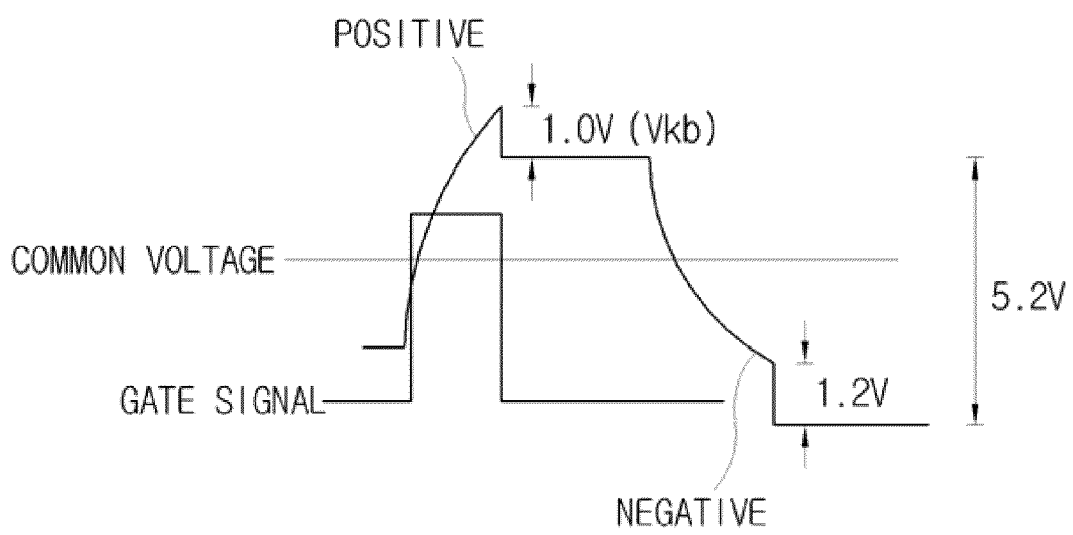
FIGS. 8A through 8C illustrate pixel voltage difference due to delay of a gate signal.
Figure 8B:
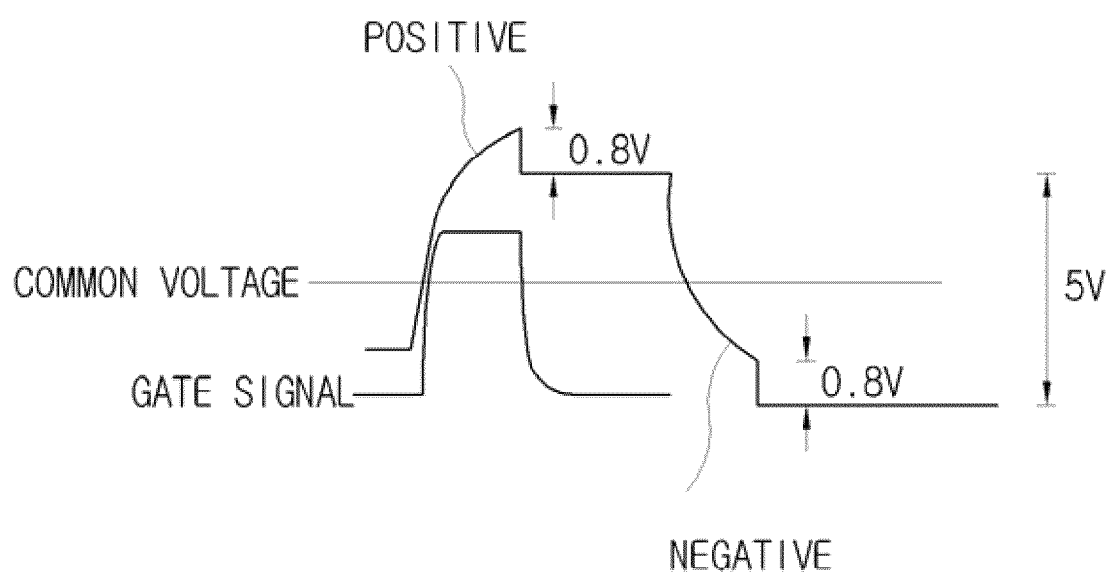

FIGS. 8A and 8B illustrate the kickback voltage at a first pixel disposed at the leftmost side where the gate signal is delayed less and the kick back voltage at a second pixel disposed at the rightmost side where the gate signal is substantially more delayed.

In the first pixel of FIG. 8A, the kickback voltage is 1V when a positive pixel voltage is applied, and the kickback voltage is 1.2V when a negative pixel voltage is applied. In the second pixel of FIG. 8B, the kickback voltage is 0.8V both when a positive pixel voltage is applied and when a negative pixel voltage is applied.

Thus, the ultimate root mean square voltage which remains at the pixel is higher in the first pixel than in the second pixel. As the brightness difference becomes greater depending on the difference in pixel voltage in a low gray scale voltage illustrated in FIG. 7, the part corresponding to the first pixel appears brighter on the screen.

Figure 8C:
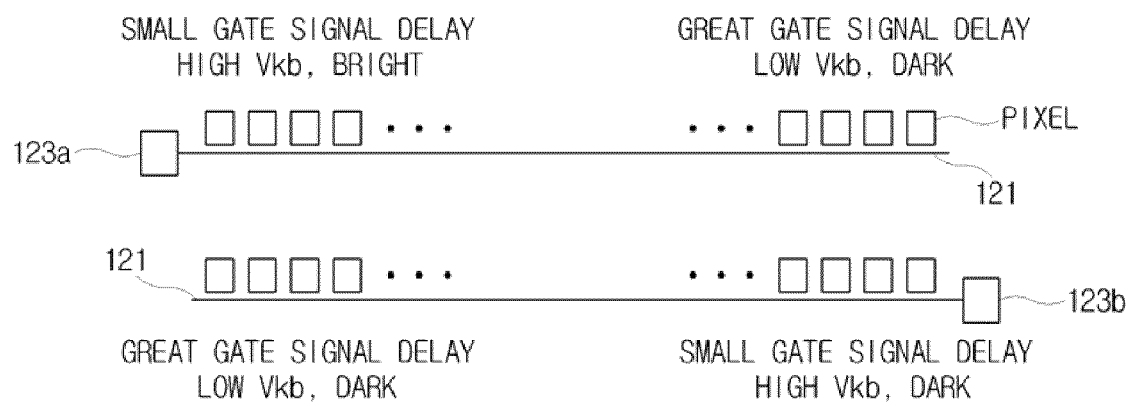

Referring to FIG. 8C, the gate signal is less delayed from right to left in pixels connected to the first shift register 123a on the left side. Accordingly, the kickback voltage Vkb becomes higher and the screen corresponding thereto becomes brighter from right to left. On the contrary, the gate signal is less delayed from left to right in pixels connected to the second shift register 123b on the right side. Accordingly, the kickback voltage Vkb becomes higher and the screen corresponding thereto becomes brighter from left to right.

As described above, the brightness varies on the right and the left portions of the screen depending on the position of the shift register 123, and accordingly a transverse line is seen on the screen. This problem is more serious in large-size LCD devices where the gate signal is delayed more because of the longer gate lines.

Figure 9:
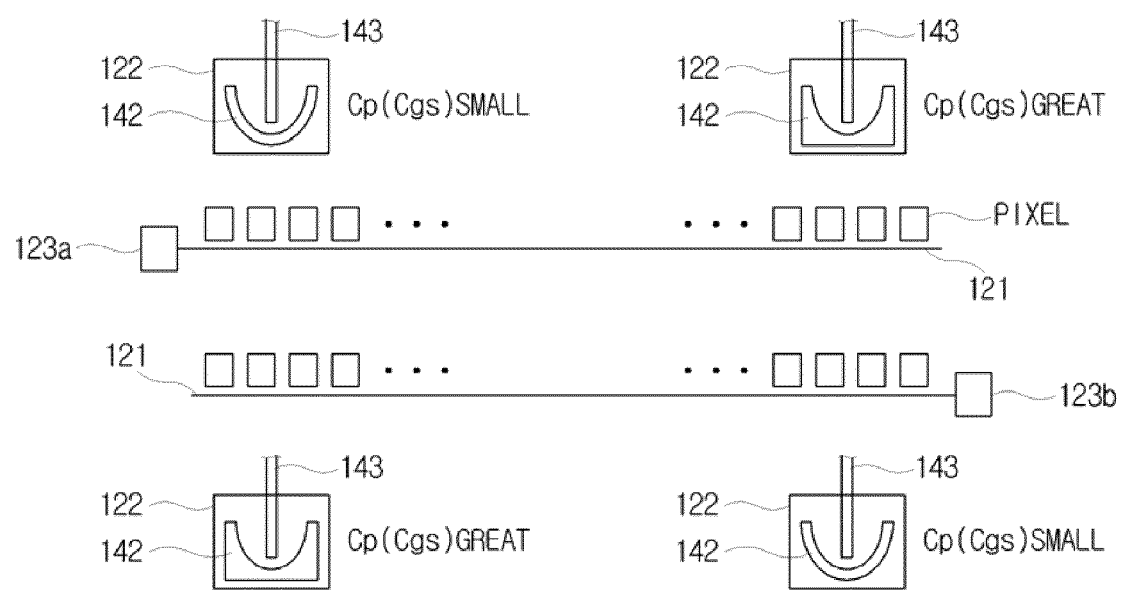
FIG. 9 illustrates Cgs variation in the LCD device according to the first exemplary embodiment of the present invention.

In exemplary embodiments of the present invention, the forgoing problem is solved by adjusting parasitic capacity Cp and/or storage capacity Cst. In the first exemplary embodiment, the parasitic capacity Cp, specifically, the parasitic capacity Cgs between the gate electrode 122 and the source electrode 142 is adjusted, which will be described with FIG. 9.

In the left pixel of the pixels connected to the first shift register 123a, the area where the gate electrode 122 and the source electrode 142 overlap is relatively small. On the contrary, in the right pixel of the pixels connected to the first shift register 123a, the area where the gate electrode 122 and the source electrode 142 overlap is relatively large. That is, in the pixels, the area where the gate electrode 122 and the source electrode 142 overlap decreases towards the first shift register 123a, thereby reducing the parasitic capacity Cgs.

The value of (Von-Voff) increases towards the first shift register 123a, while the parasitic capacity Cgs decreases towards the first shift register 123a. In equation 1, as the kickback voltage Vkb is proportional to the parasitic capacity Cp, the difference between the kickback voltages of the pixels connected to the first shift register 123a decreases. Namely, the variation of parasitic capacity Cp compensates for the variation of the value of (Von-Voff), thereby decreasing the difference between the kickback voltages of the pixels.

The difference between the kickback voltages of the pixels may be within ±10% in the positive pixel voltage and in the negative pixel voltage, respectively.

On the other hand, in pixels connected to the second shift register 123b, the parasitic capacity Cgs decreases towards the right. Thus, the difference between the kickback voltages of the pixels connected to the second shift register 123b decreases.

In the aforementioned first exemplary embodiment, the difference between the kickback voltages Vkb of the pixels decreases, thereby improving the display quality.

Figure 10:
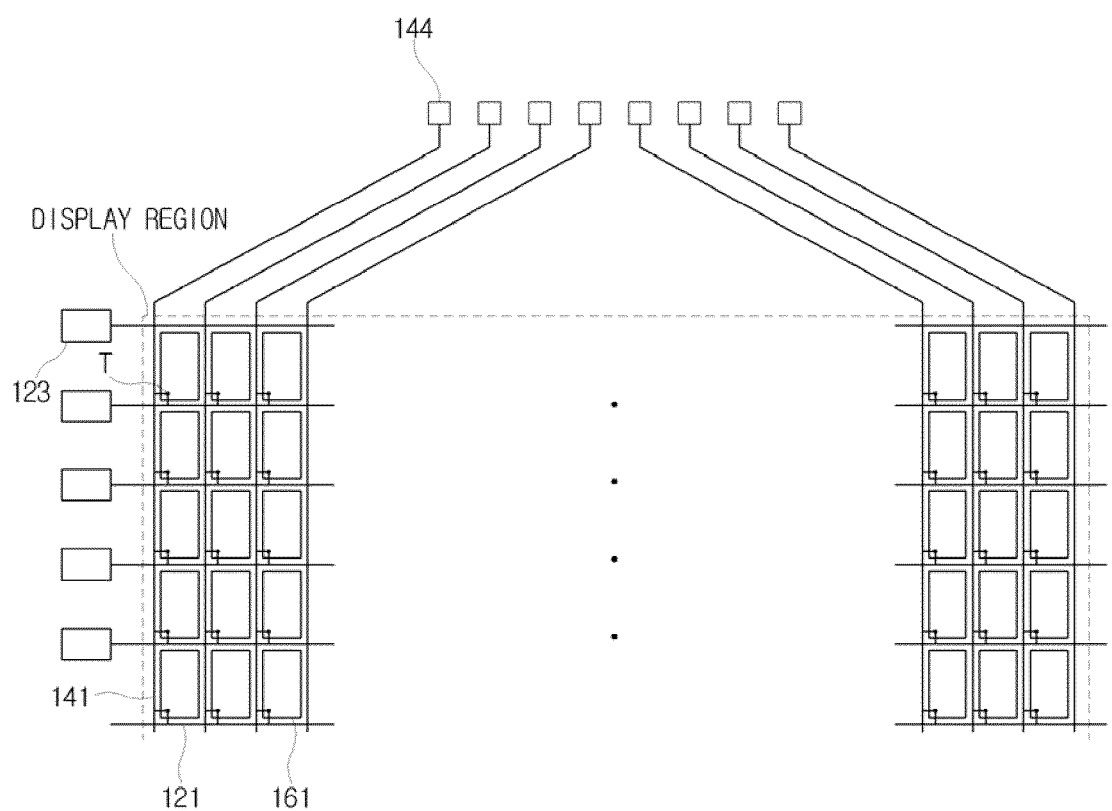
FIG. 10 is an arrangement view of a first substrate in an LCD device according to a second exemplary embodiment of the present invention.
Figure 11:
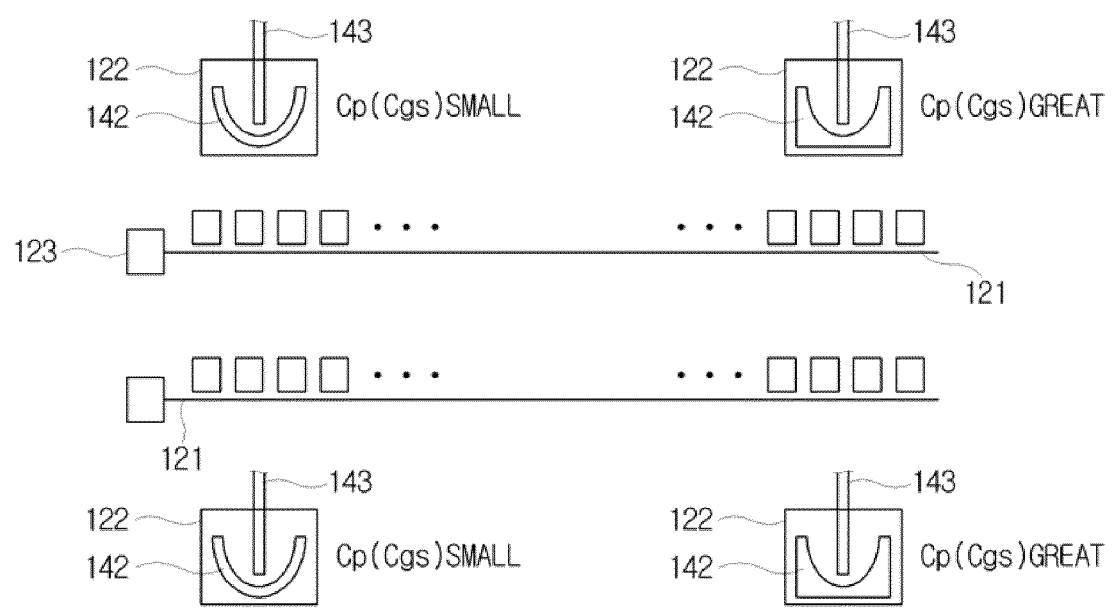
FIG. 11 illustrates Cgs variation in the LCD device according to the second exemplary embodiment of the present invention.

Referring to FIGS. 10 and 11, a second exemplary embodiment of the present invention will be described.

The shift register 123, a gate driver, is formed only on the left side of a display region. The pixel electrode 161 extends lengthwise along an extending direction of the data lien 141.

In the second exemplary embodiment, the number of gate lines 121 decreases by one-third, while the number of data lines 141 increases by three times as compared with those of the first exemplary embodiment.

As the shift register 123 is formed only on the left side of the display region, the screen is displayed more brightly on the left part of the display region which is adjacent to the shift register 123.

In the present embodiment, the parasitic capacity is adjusted to reduce the brightness difference as was explained in the first exemplary embodiment, and therefore the description thereof will be omitted.

Accordingly, the difference between the kickback voltages of pixels on the left side and the right side decreases, and thus the brightness of the screen becomes more uniform.

Figure 12:
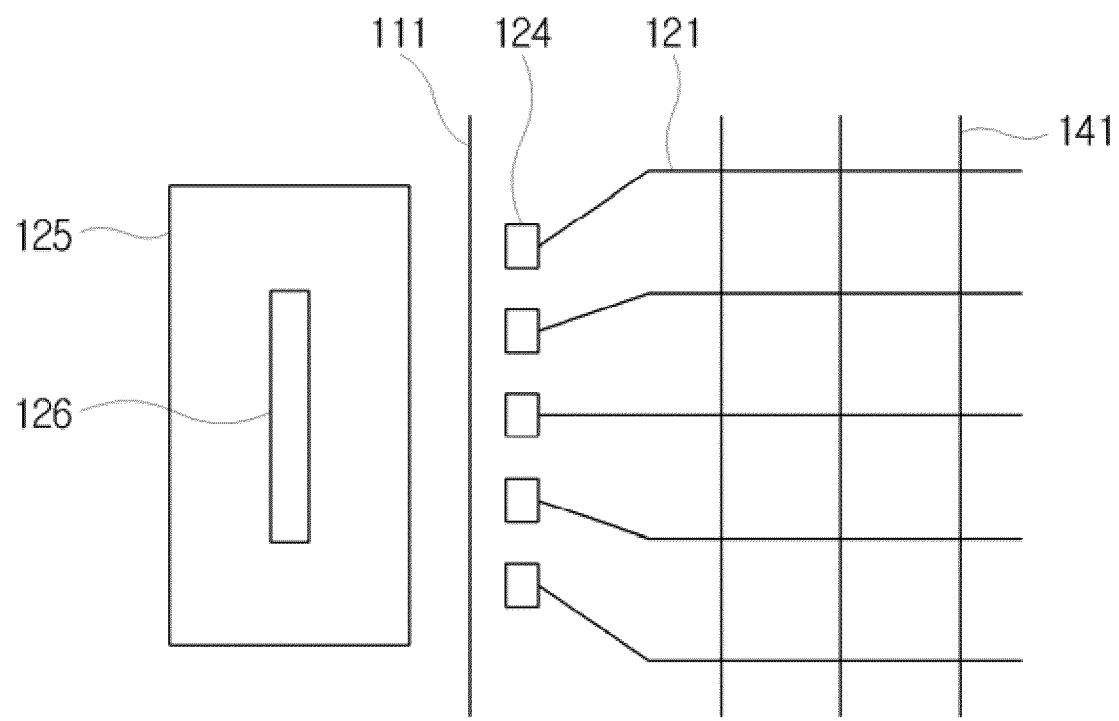
FIG. 12 illustrates a first substrate in an LCD device according to a third exemplary embodiment of the present invention.
Figure 13:
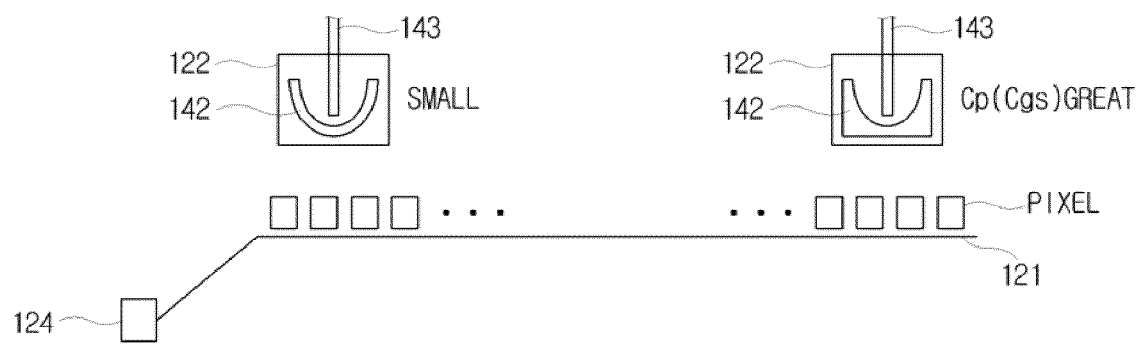
FIG. 13 illustrates Cgs variation in the LCD device according to the third exemplary embodiment of the present invention.

Referring to FIGS. 12 and 13, a third exemplary embodiment of the present invention will be described.

A first substrate 100 further includes a gate driving chip 126 and a flexible film 125, and a gate line 121 is connected to a gate pad 124 which is disposed in a non-display region.

A metal pattern (not shown) is formed on the flexible film 125 and in contact with the gate pad 124. The gate driving chip 126 drives the gate line 121 through the metal pattern and the gate pad 124. In other exemplary embodiments, the gate driving chip 126 may be mounted directly on a first insulating substrate 111 without the flexible film 125.

As described in the second exemplary embodiment, the gate pad 124 is formed only on the left side of the display region. Thus, a screen is displayed brighter on its left part of the display region which is adjacent to the gate pad 124.

In the present embodiment, parasitic capacity is adjusted to reduce the brightness difference, as explained in the first exemplary embodiment, and repetitive description thereof will be omitted.

Accordingly, the difference between the kickback voltages of pixels on the left side and the right side decreases, and thus the brightness of a screen becomes more uniform.

Figure 14:
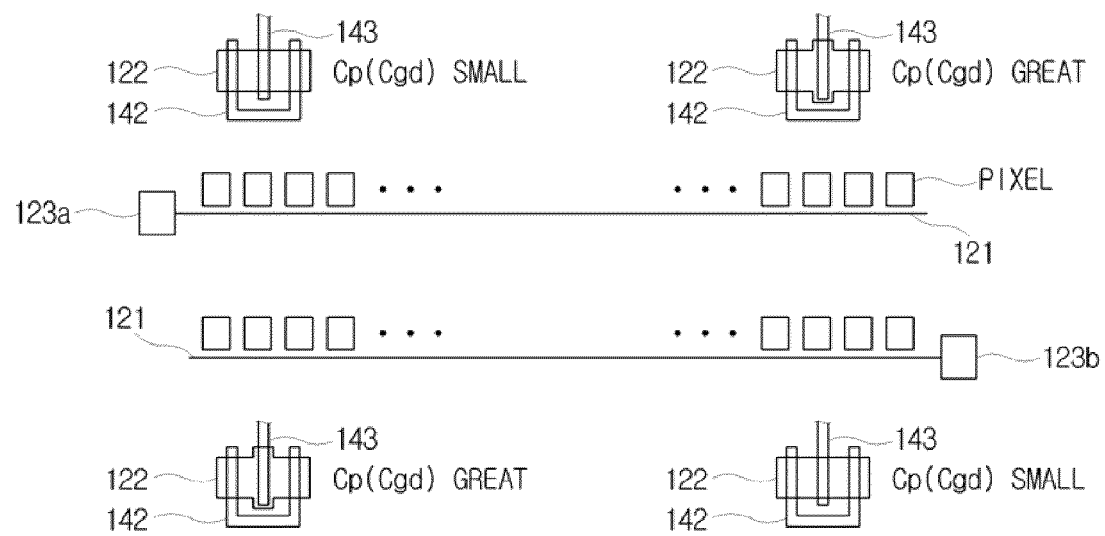
FIG. 14 illustrates Cgd variation in an LCD device according to a fourth exemplary embodiment of the present invention.

Referring to FIG. 14, a fourth exemplary embodiment of the present invention will be described.

In the present embodiment, parasitic capacity Cgd between the gate electrode 122 and the drain electrode 143 is adjusted to reduce brightness differences.

A pair of channel regions of a thin film transistor T is provided with the drain electrode 143 disposed therebetween. In this structure, although the drain electrode 143 and the gate electrode 122 are misaligned a little, a predetermined channel region is ensured.

In the left pixel of the pixels connected to a first shift register 123a, the area where the gate electrode 122 and the drain electrode 143 overlap is relatively small. On the contrary, in the right pixel of the pixels connected to the first shift register 123a, the area where the gate electrode 122 and the drain electrode 143 overlap is relatively large. That is, in the pixels, the area where the gate electrode 122 and the drain electrode 143 overlap decreases as towards the first shift register 123a, thereby reducing the parasitic capacity Cgd.

The value of (Von-Voff) increases towards the first shift register 123a, while parasitic capacity Cgs decreases towards the first shift register 123a. In equation 1, as the kickback voltage Vkb is proportional to parasitic capacity Cp, the difference between kickback voltages of the pixels connected to the first shift register 123a decreases. Accordingly, the variation of the parasitic capacity Cp compensates for the variation of the value of (Von-Voff), thereby maintaining the kickback voltages of the pixels.

On the other hand, in pixels connected to the second shift register 123b, the parasitic capacity Cgs decreases towards the right. That is, the variation of parasitic capacity Cp compensates for the variation of the value of (Von-Voff), thereby decreasing the difference between the kickback voltages Vkb of the pixels.

In the aforementioned fourth exemplary embodiment, the difference between the kickback voltages Vkb of the pixels decreases, thereby improving a display quality.

Figure 15:
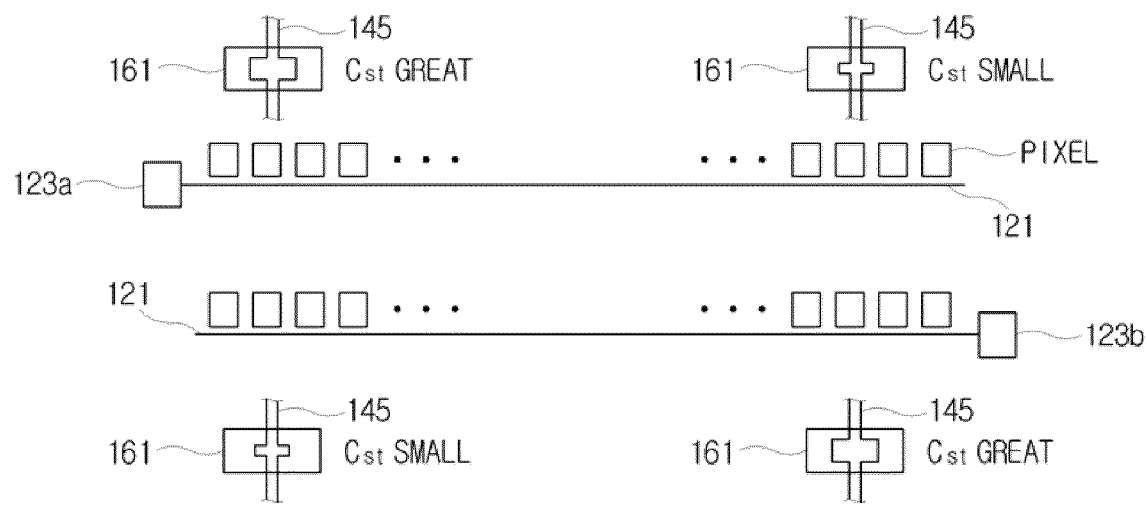
FIG. 15 illustrates Cst variation in an LCD device according to a fifth exemplary embodiment of the present invention.

Referring to FIG. 15, a fifth exemplary embodiment of the present invention will be described. In the present embodiment, storage capacity Cst is adjusted to reduce brightness differences.

In the left pixel of the pixels connected to a first shift register 123a, the area where a storage electrode line 145 and a pixel electrode 161 overlap is relatively large. On the contrary, in a right pixel of the pixels connected to the first shift register 123a, the area where the storage electrode line 145 and the pixel electrode 161 overlap is relatively small. That is, in the pixels, the area where the storage electrode line 145 and the pixel electrode 161 overlap increases towards the first shift register 123a, thereby increasing the storage capacity Cst.

The value of (Von-Voff) increases towards the first shift register 123a, and storage capacity Cst increases towards the first shift register 123a. In equation 1, as the kickback voltage Vkb is in inverse proportion to the storage capacity Cst, the difference between kickback voltages of the pixels connected to the first shift register 123a decreases. Accordingly, the variation of the storage capacity Cst compensates for the variation of the value of (Von-Voff), thereby decreasing the difference between the kickback voltages Vkb of the pixels.

On the other hand, in pixels connected to the second shift register 123b, the storage capacity Cst increases towards the right. Thus, the difference between the kickback voltages Vkb of the pixels connected to the second shift register 123b decreases.

In the aforementioned fifth exemplary embodiment, the difference between the kickback voltages Vkb of the pixels decreases, thereby improving the display quality.

Figure 16:
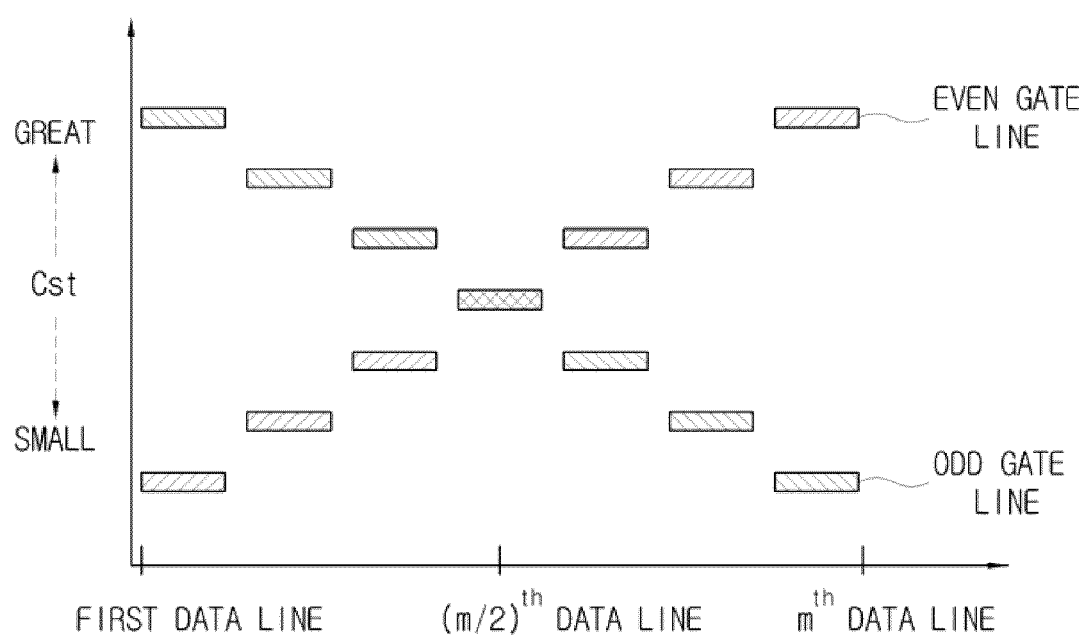
FIG. 16 illustrates Cst variation in an LCD device according to a sixth exemplary embodiment of the present invention.

Referring to FIG. 16, a sixth exemplary embodiment of the present invention will be described.

Storage capacity Cst of pixels which correspond to odd numbered gate lines 121 connected to a left shift register 123 decreases towards the right. On the other hand, storage capacity Cst of pixels which correspond to even numbered gate lines 121 connected to a right shift register 123 increases towards the right.

In the sixth exemplary embodiment, the storage capacity Cst of the pixels varies stepwise, and the pixels are divided into a plurality of blocks which have the same storage capacity. In the sixth exemplary embodiment, it is easy to design the first substrate 100.

The exemplary embodiments of the present invention may be modified variously. For example, at least two of the two parasitic capacities Cgs and Cds and the storage capacity Cst may be changed at the same time.

As described above, the present invention provides an LCD device in which brightness non-uniformity due to a delay difference of a gate signal is reduced.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display device comprising:
   a first substrate having a plurality of pixels formed in a display region, each pixel comprising a thin film transistor and a pixel electrode electrically connected to the thin film transistor;
   a second substrate facing the first substrate; and
   a liquid crystal layer interposed between the first substrate and the second substrate,
   the first substrate comprising
   a gate line and a data line; and
   a gate driver,
   the thin film transistor comprising
   a gate electrode electrically connected to the gate line;
   a source electrode electrically connected to the data line; and
   a drain electrode electrically connected to the pixel electrode, wherein a parasitic capacity value of a parasitic capacity between the gate electrode and the source electrode is smaller for a first pixel than for a second pixel that is disposed farther from the gate driver than the first pixel.

2. The liquid crystal display device according to claim 1, wherein the thin film transistor comprises a U-shape channel region, and an area where the gate electrode and the drain electrode overlap becomes smaller towards the gate driver.

3. The liquid crystal display device according to claim 1, wherein a storage capacity of the pixel becomes larger towards the gate driver.

4. The liquid crystal display device according to claim 1, wherein a first portion of the source electrode is disposed between the data line and the drain electrode in an arrangement view of the liquid crystal display device, and the drain electrode is disposed between the first portion of the source electrode and a second portion of the source electrode in the arrangement view of the liquid crystal display device.

5. The liquid crystal display device according to claim 1, wherein the pixel electrode extends lengthwise in an extending direction of the gate line.

6. A liquid crystal display device comprising:
   a first substrate having a plurality of pixels formed in a display region, each pixel comprising a thin film transistor and a pixel electrode electrically connected to the thin film transistor;
   a second substrate facing the first substrate; and
   a liquid crystal layer interposed between the first substrate and the second substrate,
   the first substrate comprising
   a gate line and a data line; and
   a gate driver which comprises a shift register and applies a gate driving signal to the gate line,
   the thin film transistor comprising
   a gate electrode electrically connected to the gate line;
   a source electrode electrically connected to the data line; and a drain electrode electrically connected to the pixel electrode, wherein the gate electrode has a constant size towards the gate driver and overlaps the drain electrode, wherein the gate electrode has at least one more protrusion for a first thin film transistor than for a second thin film transistor that is disposed closer to the gate driver than the first thin film transistor, wherein a parasitic capacity value of the pixels decreases towards the gate driver, and wherein the parasitic capacity value includes at least one of a parasitic capacity between the gate electrode and the source electrode and a parasitic capacity between the gate electrode and the drain electrode.

7. The liquid crystal display device according to claim 6, wherein the thin film transistor comprises a U-shape channel region, and an area where the gate electrode and the drain electrode overlap becomes smaller towards the gate driver.

8. The liquid crystal display device according to claim 6, wherein a storage capacity of the pixel becomes larger towards the gate driver.

9. The liquid crystal display device according to claim 6, wherein a first portion of the source electrode is disposed between the data line and the drain electrode in an arrangement view of the liquid crystal display device, and the drain electrode is disposed between the first portion of the source electrode and a second portion of the source electrode in the arrangement view of the liquid crystal display device.

10. The liquid crystal display device according to claim 6, wherein the pixel electrode extends lengthwise in an extending direction of the gate line.

11. The liquid crystal display device according to claim 6, wherein the shift register comprises a first shift register and a second shift register which are disposed opposite to each other with respect to the display region.

12. The liquid crystal display device according to claim 11, wherein the gate line is alternately connected to the first shift register and the second shift register.

13. The liquid crystal display device according to claim 6, wherein the source electrode becomes smaller towards the gate driver.

14. The liquid crystal display device according to claim 1, wherein the gate electrode has a constant size towards the gate driver and overlaps the drain electrode.

15. The liquid crystal display device according to claim 1, wherein the source electrode becomes smaller towards the gate driver.

16. A liquid crystal display device comprising:
a first substrate;
a second substrate facing the first substrate;
a liquid crystal layer interposed between the first substrate and the second substrate;
a gate driver disposed at the first substrate;
a gate line electrically connected to the gate driver;
a first data line;
a second data line;
a first pixel electrode;
a second pixel electrode;
a first thin film transistor including: a first gate electrode electrically connected to the gate line, a first source electrode electrically connected to the first data line, and a first drain electrode electrically connected to the first pixel electrode; and
a second thin film transistor disposed closer to the driver than the first thin film transistor, the second thin film transistor including: a second gate electrode electrically connected to the gate line, a second source electrode electrically connected to the second data line, and a second drain electrode electrically connected to the second pixel electrode,
wherein a capacity between the second gate electrode and the second source electrode is less than a capacity between the first gate electrode and the first source electrode.

17. The liquid crystal display device according to claim 16, wherein the second source electrode is smaller than the first source electrode.

18. The liquid crystal display device according to claim 16, wherein the second drain electrode overlaps the second gate electrode, the first drain electrode overlaps the first gate electrode, and the second gate electrode is equal to the first gate electrode in size.

19. The liquid crystal display device according to claim 16, wherein the first source electrode has a curved edge, wherein the drain electrode is disposed between the curved edge and the data line in an arrangement view of the liquid crystal display device.

20. The liquid crystal display device according to claim 16, wherein the second source electrode has two curved edges that are parallel to each other.

* * * * *